United States Patent [19]

Segnan

[11] Patent Number: 5,889,995

[45] Date of Patent: Mar. 30, 1999

[54] USING CONSTANT SELECTORS FOR METHOD IDENTIFICATION

[75] Inventor: Marino Segnan, Palo Alto, Calif.

[73] Assignee: Sun Microsystems, Inc., Palo Alto, Calif.

[21] Appl. No.: 650,237

[22] Filed: May 20, 1996

[51] Int. Cl.[6] ........................................................ G06F 9/45
[52] U.S. Cl. ........................... 395/705; 395/703; 395/680
[58] Field of Search .................................... 395/701, 702, 395/703, 705, 680, 683

[56] References Cited

U.S. PATENT DOCUMENTS

| 5,421,016 | 5/1995 | Conner et al. ........................... 395/700 |
| 5,515,536 | 5/1996 | Corbett et al. ........................... 395/700 |
| 5,535,391 | 7/1996 | Hejlsberg et al. ....................... 395/700 |

OTHER PUBLICATIONS

Atkinson, "Hurricane: An Optimizing Compiler for Smalltalk," Conference Proceedings from Object–Oriented Programming Systems, Languages and Applications (OOPSLA) '86, Sep. 29—Oct. 2, 1986, Portland, Oregon, vol. 21, No. 11, pp. 151–158 (1986).

Baron et al., "MACH Kernel Interface Manual," Department of Computer Science, Carnegie–Mellon University, Pittsburgh, Pennsylvania, research sponsored by the Defense Advanced Research Projects Agency (DOD), ARPA Order No. 4864, monitored by the Space and Naval Warfare Systems Command under contract N00039–84–C–0467, version of 23 Aug. 1990.

Chambers et al., "An Efficient Implementation of SELF, a Dynamically–Typed Object–Oriented Language Based on Prototypes," Conference Proceedings from OOPSLA '89, Oct. 1–6, 1989, New Orleans, Louisiana, vol. 24, No. 10, pp. 49–70 (1989).

Rose, "Fast Dispatch Mechanisms for Stock Hardware," Conference Proceedings from OOPLSA '88, Sep. 25–30, 1988, San Diego, California, vol. 23, No. 11, pp. 27–35 (1988).

Walmer et al., "A Programmer's Guide to the MACH System Calls," Department of Computer Science, Carnegie–Mellon University, Pittsburgh, Pennsylvania, version of 16 Nov. 1989.

Walmer et al., "A Programmer's Guide to the MACH User Environment," Department of Computer Science, Carnegie–Mellon University, Pittsburgh, Pennsylvania, version of 16 Nov. 1989.

Primary Examiner—Tariq R. Hafiz
Assistant Examiner—Kakali Chaki
Attorney, Agent, or Firm—Beyer & Weaver, LLP

[57] ABSTRACT

A process for generating method invocation instructions for a source-code program expressed in an object-oriented computer programming language is described. The process can be implemented as a compiler or, alternatively, as a combination of one or more utility routines and a compiler. The process first generates a global method selector list (hereinafter referred to as the dispatch table) comprising all of a target program's known method selector strings. Next, a unique constant value identifier is assigned to each unique method selector. Finally, as each source-code method call instruction is parsed during compilation, the compiler uses the method selector's identifier value to generate an instruction to directly load a unique constant value method identifier. In one embodiment, generation of the dispatch table is done a priori to the source-code program's compilation by a utility routine. In an alternative embodiment, the compiler performs these operations directly. Benefits of the compiler include, but are not limited to, (1) reduced executable code size (2) reduced program initialization time and (3) increased program execution speed.

31 Claims, 8 Drawing Sheets

IDENTIFY EACH METHOD SELECTOR IN A TARGET SOURCE-
CODE PROGRAM.     600

ASSIGN A UNIQUE CONSTANT VALUE INDEX TO EACH IDENTIFIED
METHOD SELECTOR.     605

COMPILE THE TARGET PROGRAM USING THE IDENTIFIED
METHOD SELECTOR INDICES TO GENERATE RUN-TIME
INSTRUCTIONS.     610

FIG. 9

LOAD INTO WORKING MEMORY THE DISPATCH TABLE ASSOCIATED WITH THE TARGET PROGRAM OR EXECUTABLE IMAGE.
|
v
LOAD INTO WORKING MEMORY AN IMAGE OF THE TARGET PROGRAM'S SOURCE-CODE FILE(S).
|
v
IDENTIFY, IN THE TARGET PROGRAM, A METHOD CALL INSTRUCTION'S METHOD SELECTOR.
|
v
SEARCH THE DISPATCH TABLE FOR THE IDENTIFIED METHOD SELECTOR.
|
v
MATCH FOUND?

IF YES:
NO FURTHER ACTION IS REQUIRED.

IF NO:
CREATE A NEW ENTRY IN THE DISPATCH TABLE; ASSIGN A NEW (UNIQUE) CONSTANT VALUED IDENTIFIER TO THE SELECTOR; AND UPDATE THE DISPATCH TABLE TO REFLECT THE NEWLY IDENTIFIED/INDEXED SELECTOR.

USING CONSTANT SELECTORS FOR METHOD IDENTIFICATION

FIELD OF THE INVENTION

The invention relates in general to the field of software design and, more particularly, to a technique for processing method calls during the compilation phase of program development. Specifically, the invention provides a basis for using constant selectors (such as positive integers) for method dispatch operations in an object-oriented program.

BACKGROUND OF THE INVENTION

The term "method" has a commonly understood meaning within the field of object-oriented computer program development and another, albeit different meaning, in the field of patent law. To avoid confusion, the following description will use the term "method" as typically understood within the field of object-oriented computer programming. The term "process" will be used as an expression of a "method of doing something," that is, in the sense of performing a series of operations that comprise a patentable "process."

As shown in FIG. 1 a typical computer (or computer system) 100 is comprised of a processor 105 device, working memory 110 (often referred to as random access memory or RAM), one or more long-term storage devices 115 (such as, for example, magnetic hard and floppy disks, magnetic tape units, and optical disks), a display unit 120, and an input device such as, for example, a keyboard 125. As would be known to those of ordinary skill, long-term storage devices 115 are used to store programs 130 that are loaded into memory 110 prior to the program's execution by the processor 105. One illustrative program 130 is a compiler program.

Consider the compilation of a computer program written in the "OBJECTIVE-C" programming language and having multiple source-code files. In the illustrative example shown in FIG. 2, a program 200 is comprised of two source-code files, file1.m 205 and file2.m 210 respectively. As shown, each source-code file contains a plurality of method call instructions. When the method call [a x] is executed at run-time, it invokes a method named "x" in an instance of a class named "a," where "x" is a string value referred to as a method selector or, alternatively, a method name string.

During program 200 compilation, an "OBJECTIVE-C" compiler program, referred to simply as a compiler, generates an object-code file for each source-code module, where a source-code module comprises a specific source-code file (e.g., file1.m 205) and any additional files included in the specified source-code file such as, for example, by the "#include" directive. (Those of ordinary skill will recognize that the actual compiler operations are performed by a suitable computer system that reads the instructions and/or data of the compiler program from a program storage device and executes the instructions.)

As shown in FIG. 3, each object-code file contains, among other things, a local name table that has a pointer to every method selector used in a method call in the source-code module. Thus, file1.o 300 contains local name table 1 305 having entries that point to every method selector used in a method call instruction in file1.m 205. A similar object-code file is generated for source-code file file2.m 210, see elements 310 and 315.

Referring again to FIGS. 2 and 3, when the compiler parses the method call [a x] from source-code file1.m 205, it generates executable instructions to perform the following operations:

Step 1: Load a pointer to the instance of the object 'a' into a first specified register of the processor executing the program (the value 'a' represents an object type identifier).

Step 2: Load a pointer to the local name table 305 associated with the method call.

Step 3: Modify the value of the pointer loaded in step 2 to account for the offset into the local name table 305 at which the string variable "x" (method selector) is located.

Step 4: Generate an instruction to call a standard method dispatch function such as, for example, MessageSend. As would be known to those of ordinary skill, the dispatch function MessageSend is responsible, at program run-time, for locating the executable code segment associated with the method being called, method "x." (The pointer value loaded in step 1 is MessageSend's first parameter and the pointer value loaded in step 2 is MessageSend's second parameter.)

As made clear by steps 2 and 3 above, compilation of a (source-code) method call generates two machine executable instructions, implementing an indirect addressing technique to identify a target method selector. One instruction loads a pointer to the method call's local name table (step 2 above) and the other adjusts that pointer so that it points to the precise method selector being invoked (step 3 above).

Following compilation, a linker is used to generate a single executable file that includes, among other things, substantially each object-code file. As shown in FIG. 4, an executable file 400 contains local name table 1 305 from file1.o 305 and local name table 2 315 from file2.o 310. Those of ordinary skill in the art will recognize that object-code files 300 and 310 also contain code segments and global data information and that this information is also incorporated into the executable file 400. See elements 405 and 410. Thus, a typical link operation generates an executable file that can contain multiple copies of any given method selector. In fact, anytime a method selector is used in a method call in more than a single source-code file, the resulting executable file will contain multiple copies of that method selector.

At execution time, a run-time library is used to load a copy of the executable file 400 into working memory, at which point it is referred to as an executable image 500 (see FIG. 5), whereafter method selector unification is performed. Following method selector unification, the executable code consisting of the compiled, linked, and loaded program is executed.

As would be known to those of ordinary skill in the art, the purpose of method selector unification is to ensure that all references to a specified method selector (in the executable image), regardless of which local name table the original reference is found in, point to a common string value. In general, method selector unification proceeds in the following fashion. First, each local name table in the executable image 500 is interrogated and a selector table 505 is created. The selector table 505 is often implemented as a hash table, having one entry for each unique method selector found in the executable image's method name tables. Next, each pointer in each local name table is modified to point to that entry in the selector table 505 that corresponds to the same method selector.

Referring again to FIG. 5, for example, local name table 1's 305 pointer to method selector 'x' 510 and local name table 2's 315 pointer to method selector 'x' 515 are consolidated (unified) in the executable image's 500 selector table 505 as a single pointer 520. Following method selector unification the run-time library begins executing the machine instructions contained in the executable image 500.

A known benefit of postponing method selector unification until program execution is that it allows a program to load, at run-time, an object module (an object-code file such as 300 or 310) that can override a previously compiled-and-linked method definition. A known drawback to this approach is that, because the compiler is limited only to referencing local name tables, it must generate instructions to implement an indirect addressing scheme as described in steps 2 and 3 above.

SUMMARY OF THE INVENTION

A process for generating method invocation instructions for a source-code program expressed in an object-oriented computer programming language such as, for example, "OBJECTIVE-C," is described. The described process can be implemented as a compiler or, alternatively, as a combination of one or more utility routines and a compiler.

A process in accordance with the invention first generates a global method selector list (hereinafter referred to as the dispatch table) comprising all of a source-code program's known method selector strings. Next, a unique constant value identifier (index) is assigned to each unique method selector. Finally, as each source-code method call instruction is parsed during compilation, the compiler uses the method selector's assigned index value to generate an instruction to directly load that index value. In one embodiment, generation of the dispatch table is done a priori to the source-code program's compilation by a utility routine. In an alternative embodiment, the compiler performs these operations directly.

If a method selector is encountered during compilation that is not in the dispatch table, the compiler can either generate method invocation instructions in accordance with prior art techniques (that is, using indirect addressing) or, alternatively, augment the dispatch table to contain an entry for the newly identified method selector and then use this new index to generate a single direct addressing instruction.

Benefits of a compiler in accordance with the invention include, but are not limited to, (1) reduced program initialization time because method selector unification can be avoided, (2) reduced executable code size because the compiler's use of direct addressing requires fewer instructions to be generated, and (3) increased execution speed because fewer instructions are being executed by the host computer system.

BRIEF DESCRIPTION OF DRAWINGS

FIG. 7b shows an initial method selector list based on the code fragment of FIG. 7a.

FIG. 9 shows, in flow chart form, one technique to augment an existing method dispatch table in accordance with the invention.

DETAILED DESCRIPTION OF A SPECIFIC EMBODIMENT

A compiler and utility routine in accordance with the invention is described below. Those of ordinary skill in the field of object-oriented compiler design will recognize that the term "compiler" refers to a computer program that converts a series of instructions expressed in a human-oriented source language (such as, for example, "OBJECTIVE-C") to a functionally equivalent series of instructions expressed in a hardware-oriented target language, referred to as object-code. Those of ordinary skill will also recognize that a utility routine is a computer program designed to perform a specific task. The computer language used to develop the utility routine is irrelevant to the present discussion.

In the interest of clarity, not all features of an actual implementation are described in this specification. It will of course be appreciated that in the development of any actual implementation (as in any software development project), numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking of software engineering for those of ordinary skill in the field of object-oriented compiler design having the benefit of this disclosure. Finally, workers of ordinary skill are presumed to have detailed knowledge about the "OBJECTIVE-C" programming language and a through knowledge about the specific compiler implementation they wish to modify in accordance with the invention.

Figure 1:
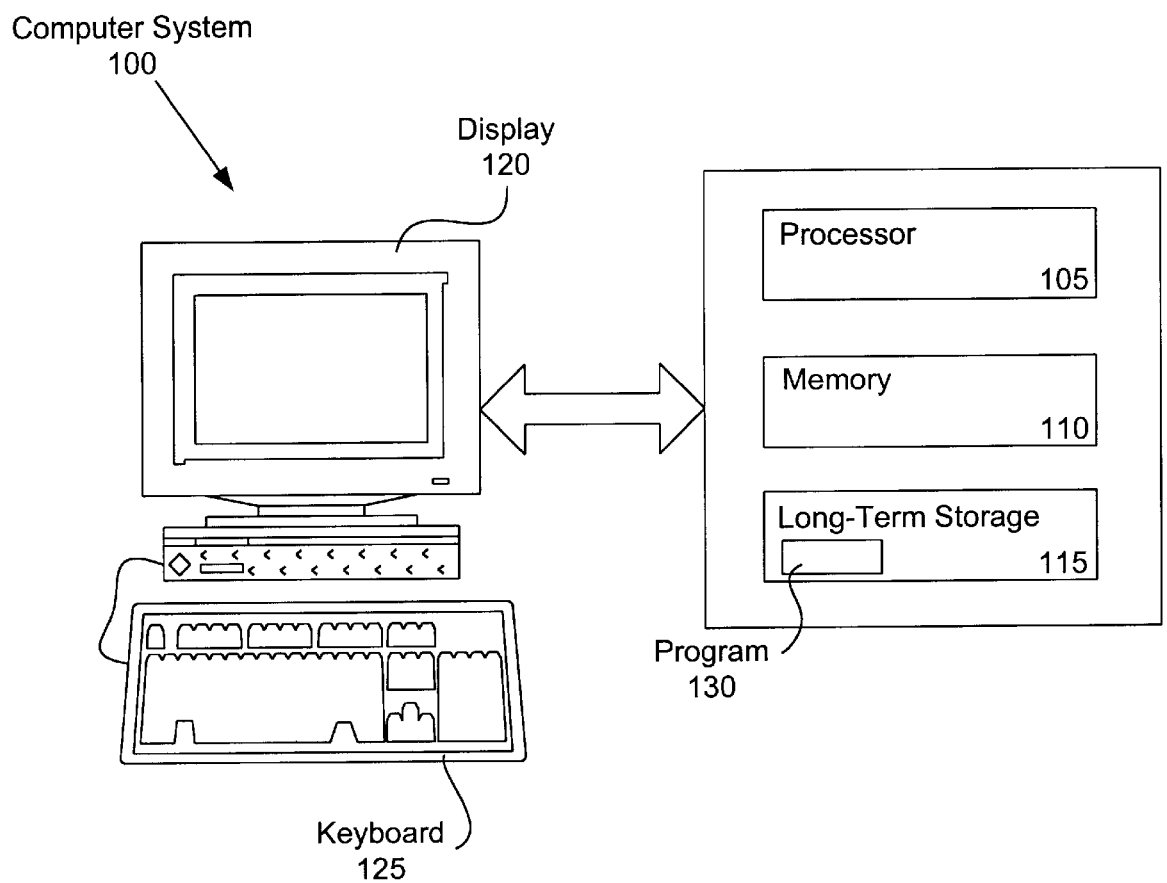
FIG. 1 shows, in block diagram form, a typical computer system.
Figure 2:
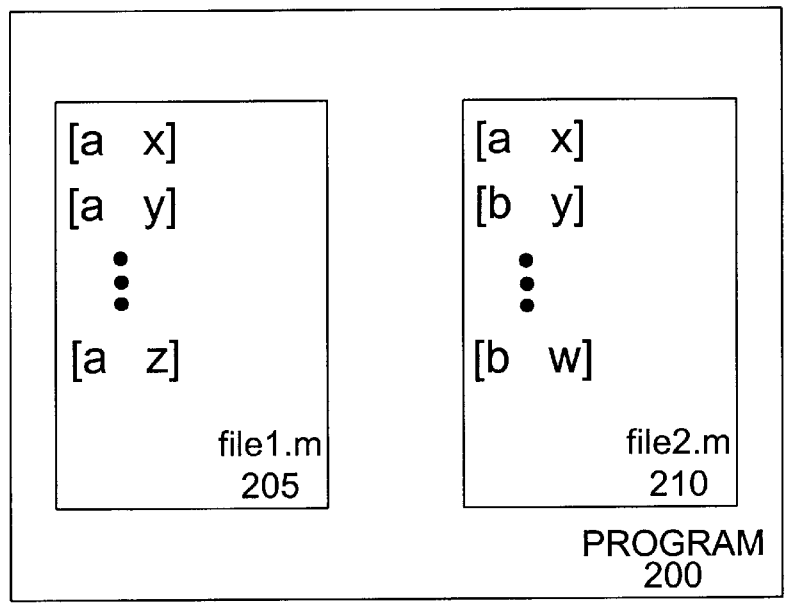
FIG. 2 illustrates a prior art multi-file source-code computer program.
Figure 3:
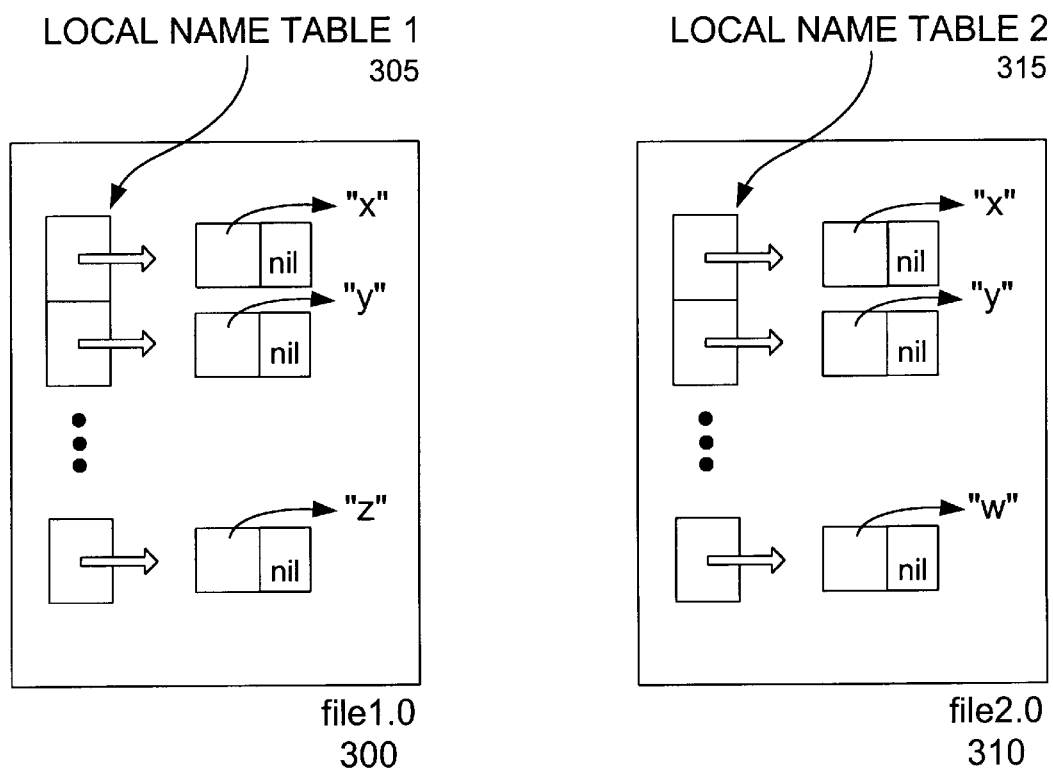
FIG. 3 illustrates the object-code files for the multi-file source-code computer program of FIG. 2.
Figure 4:
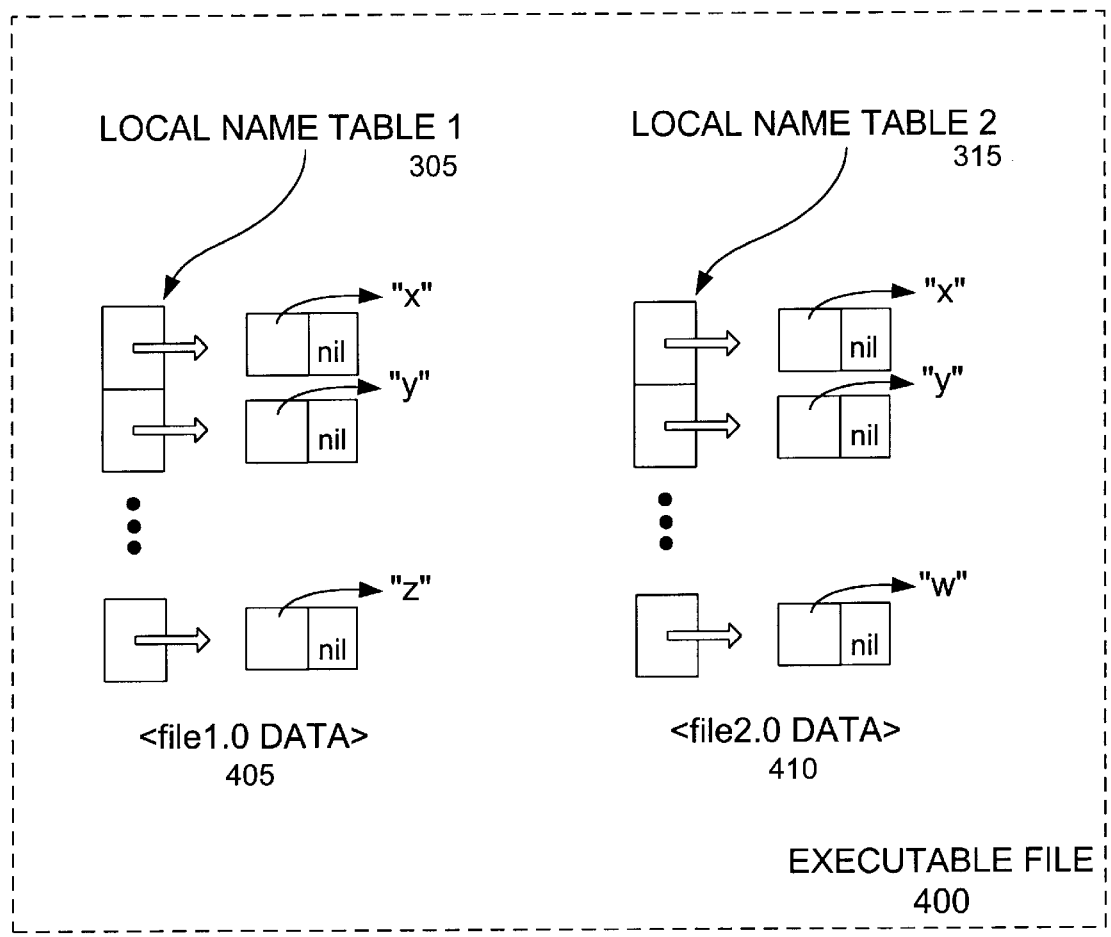
FIG. 4 illustrates an executable file for the multi-file source-code computer program of FIG. 2.
Figure 5:
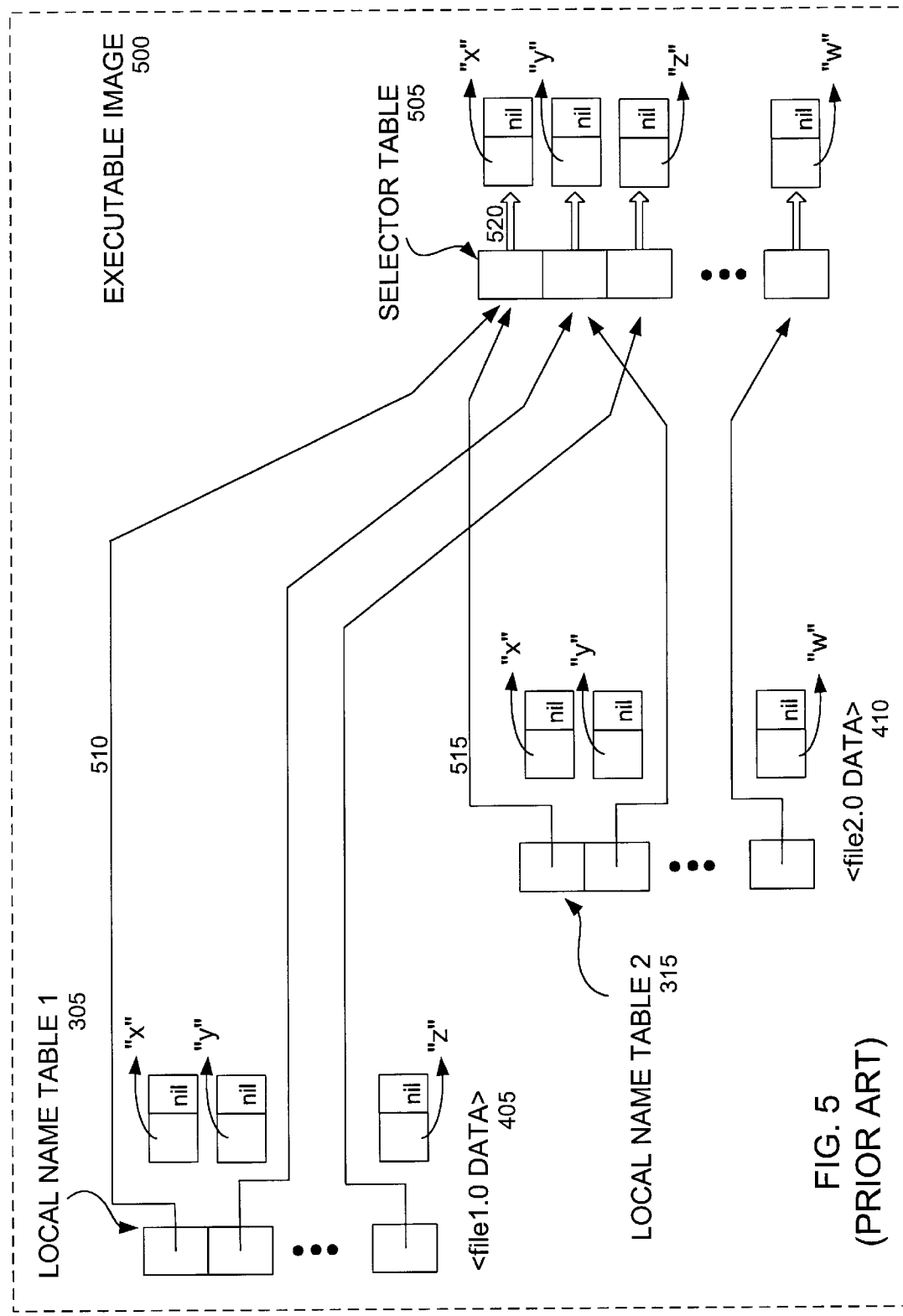
FIG. 5 illustrates the executable image for the executable file of FIG. 4.
Figure 6:
FIG. 6 shows, in flow chart form, a technique for using constant value selectors for method invocation purposes in accordance with the invention.
Figure 6:

As outlined in FIG. 6, a process for using constant value indices during program compilation comprises three basic operations: (1) identify each method call in a target program's source-code file(s) 600; (2) associate a unique constant value index with each uniquely identified method selector 605; (3) compile the target program using the constant value indices to generate direct address instructions for use by a (run-time) method dispatch function 610. Each of these operations will be discussed in detail below.

Operation One: Method Selector Identification

In one embodiment, a utility program processes each source-code file comprising a target program to identify each method call instruction. When identified, each method call's method selector can be, for example, (1) written to a text file associated with the source-code file in which it was found; (2) written into a single text file for all source-code files; or (3) temporarily stored in RAM. A salient feature of this operation is that a list of method selectors be, at least temporarily, created for subsequent manipulation. The precise means of identifying and storing each method selector is a choice left to the software engineer.

Figure 7A:
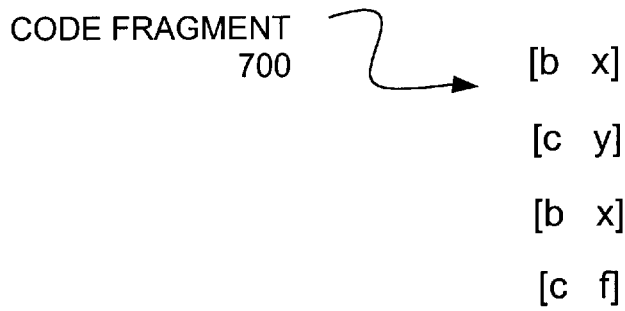
FIG. 7a shows a sample source-code fragment.
Figure 7B:
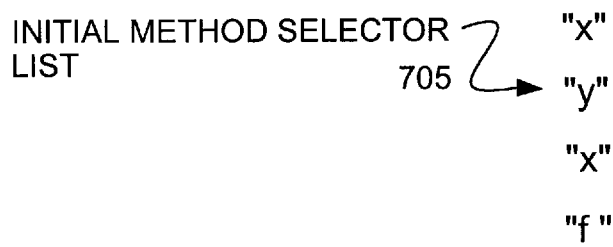

Identification of a target program's method selectors typically results in a list of method selectors that contain a number of duplicate entries; one entry for each identified method call instruction in the target program. Consider, for example, FIG. 7a in which a source-code fragment 700 comprising four method call instructions are shown. An initial list of identified method selectors 705 is shown in FIG. 7b and contains string variable entries for each method selector used in the identified method call instructions.

Figure 7C:
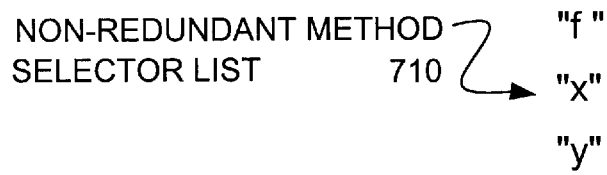
FIG. 7c shows a non-redundant method selector listed generated in one embodiment of the invention.

Following identification, the utility program can generate a list comprising a non-repeating sequence of method selectors 710 as shown in FIG. 7c. In one embodiment, the initial list of method selectors 705 is lexicographically sorted to facilitate removal of repeating entries. While this additional operation is not necessary, it may speed execution of subsequent operations.

Operation Two: Assignment of Unique Identifiers to Each Method Selector

After the list of unique method selectors 710 is created, the utility program assigns an identifier to each method selector and creates a data structure, hereinafter referred to as a dispatch table, in which to store the information. In one embodiment, each method selector is assigned a unique positive integer although, in practice, any non-zero unique identifier may be used. Typically, an identifier is selected so that its bit-length is equal to the target processor's register size. Convenient data structures in which to store the indexed list of unique method selectors (the dispatch table) include a simple array or a hash table.

Figure 8:
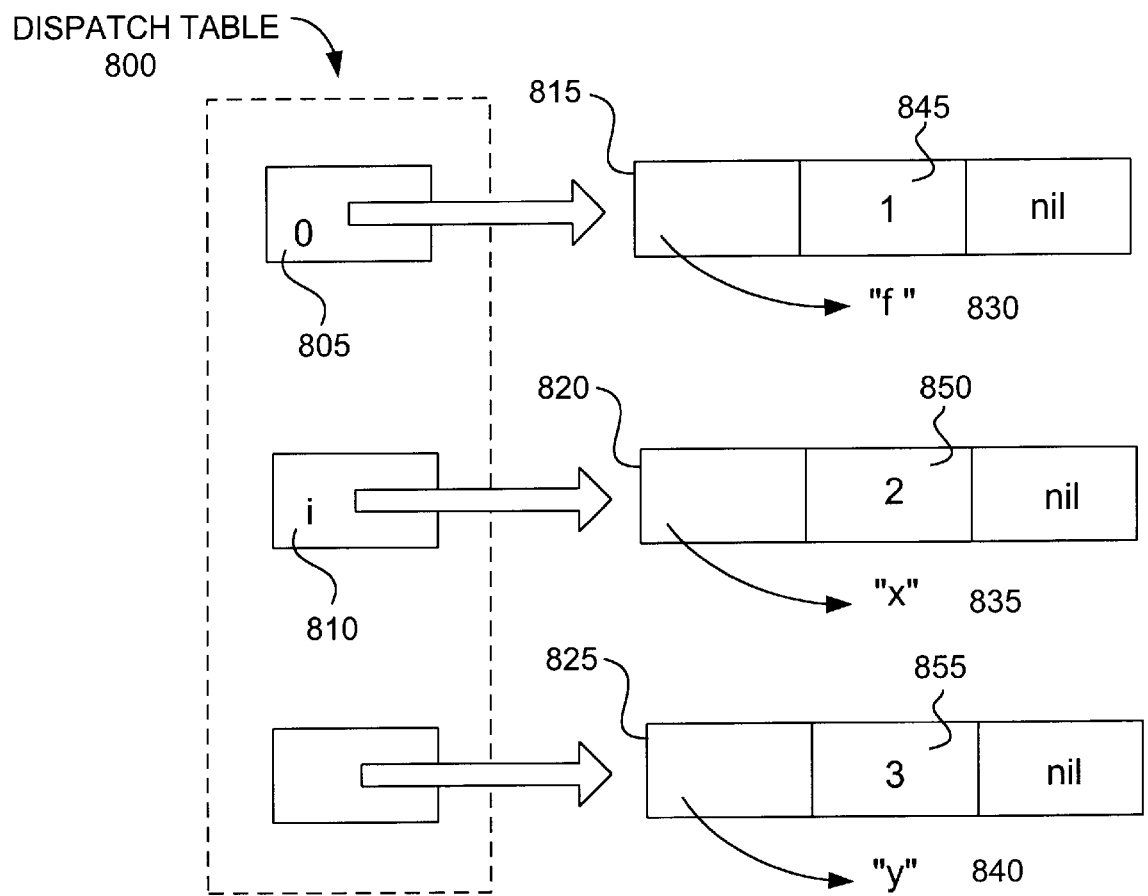
FIG. 8 shows one illustrative embodiment of a dispatch table in accordance with the invention.

FIG. 8 shows a dispatch table 800 in accordance with the invention for the nonredundant method selector list of FIG. 7c. As shown, the (hash) dispatch table 800 comprises a plurality of elements, each identified by an index such as "0" 805 and "i" 810. Each entry, in turn, points to a structure (815, 820, 825) which associates an identified method selector (830, 835, 840) and the method selector's unique identifier (845, 850, 855).

Having identified and indexed each unique method selector in a target source-code program, the generated dispatch table 800 is stored for later use by a compiler. While any storage format is acceptable, it can be advantageous to store the dispatch table 800 in a format that is amenable to rapid loading during program compilation and/or execution such as a hash table stored in binary format.

One of ordinary skill in the art of compiler design will recognize that the functions of the above described utility program could also be incorporated directly into a compiler as, for example, a preprocessing phase. Alternatively, a dispatch table 800 may be created by a program/routine that directly interrogates a program's executable file according to the following steps: (1) create a fixed size selector table (array) void of entries; (2) get a method selector from a local name table in the executable file; (3) compute an index as a function (hash) of the method selector; (4) use the computed index to identify an address in the selector table (array); (5) scan the entry at the identified selector table location to determine if the method selector is already present in the selector table; (6) if the method selector is present it has already been assigned a unique identifier and nothing more need be done; (7) if, on the other hand, the method selector is not found, assign it a unique identifier, such as the next available integer; and (8) insert the entry into the selector-table. This process would be repeated until every local name table in the executable file had been interrogated. Such a routine might logically be made a part of the programming environment's run-time library. More on the function and possible use of this technique will be described in a following section.

Operation Three: Compile the Target Program Using Method Selector Indices

A compiler in accordance with the invention loads the dispatch table into working memory in preparation for compiling the target program. If, as indicated above, it is the compiler itself that generates the dispatch table then this preliminary step may be avoided.

As the compiler parses each method call in the target program, it looks in the dispatch table to determine if the method selector has been assigned an identifier. If it has, the compiler uses that identifier to generate an instruction which directly addresses (points to) the appropriate method selector. For instance, when the compiler parses the method call instruction [b x ] (see FIG. 7a), it generates executable instructions to perform the following operations:

Step 1: Load a pointer to the instance of the class identified by 'b' into a first specified register of the processor executing the program.

Step 2: Load the selector's unique identifier '2' 850 (obtained from the dispatch table 800), into a second specified register.

Step 3: Generate a call to a dispatch function such as, for example MessageSend. As in prior art compilers, the pointer value loaded as a result of step 1 is MessageSend's first parameter and the identifier value loaded as a result of step 2 is MessageSend's second parameter.

Dispatch tables provide a means for generating instructions that can directly address a method call's method selector during run-time method dispatch operations. A compiler using a dispatch table generates fewer lines of executable code for each method call instruction it processes. Compare, for example, the sequence of instructions described above to implement a method call instruction in a compiler using a dispatch table (three instructions) and the sequence of instructions generated by a prior art compiler in the Background (four instructions). Thus, the size of an executable file generated by a compiler in accordance with the invention can be smaller than that generated by a prior art compiler. In practice, this difference can be significant for target programs that utilize a large number of method call instructions—a typical situation. Further, because fewer instructions are being executed at run-time for each method call, a target program compiled in accordance with the invention can execute faster than prior art programs. Again, this can be a significant feature in improving program run-time performance (speed).

If, during compilation, the compiler attempts to parse a method call that uses a method selector not in the existing dispatch table it can (1) generate instructions to implement indirect addressing of the identified method selector as discussed in the Background, or (2) create a new entry in the selector table, assign the method selector a unique identifier, and use the identifier as taught above. One way the compiler can find an "unknown" method selector (i.e., a method selector not previously indexed) is if the target program is modified after the dispatch table had been generated by, for example, the above describe utility program. FIG. 9 shows, in flow chart form, a method to augment a preexisting dispatch table.

Another benefit of using dispatch tables is that the compiler can generate an executable file that does not contain copies of each object module's local name tables. This feature too reduces a program's memory requirements; both long term storage for the executable file and RAM memory for the target program's executable image. Further, method selector unification (traditionally performed during program initialization) can be avoided for all method selectors identified in the dispatch table. This is because the dispatch table provides a "unified" list of method selectors. Thus, program initialization time of a target program compiled in accordance with the invention is reduced over prior art compilers.

Program Storage Device

Any of the foregoing operations may be implemented by programming a suitable general-purpose computer with a compiler program of the kind described above. The programming may be accomplished through the use of a program storage device readable by the computer and encoding a compiler program of instructions executable by the computer for performing the operations described above. The program storage device may take the form of, e.g., one or more floppy disks; a CD ROM or other optical disk; a magnetic tape; a read-only memory chip (ROM); and other forms of the kind well-known in the art or subsequently developed. The program of instructions may be "object-code," i.e., in binary form that is executable more-or-less directly by the computer; in "source-code" that requires compilation or interpretation before execution; or in some intermediate form such as partially compiled code and/or a collection of executable library files. The precise forms of the program storage device and of the encoding of instructions is immaterial here.

It will be appreciated by those of ordinary skill having the benefit of this disclosure that numerous variations from the foregoing illustration will be possible without departing from the inventive concept described herein. It is emphasized, however, that the invention for which patent protection is sought is defined in the claims that follow. Accordingly, it is the claims set forth below, and not merely the foregoing illustrations, which are intended to define the exclusive rights claimed in this application program.

What is claimed is:

1. A memory for storing data for access by a compiler program being executed on a computer system, comprising a dispatch table data structure stored in said memory, said dispatch table data structure containing information for use by said compiler program and including at least one entry, wherein each of said at least one entry has (1) a constant identifier that is associated with a method selector and (2) a pointer to said method selector.

2. The memory of claim 1, wherein said dispatch table data structure is a hash table.

3. The memory of claim 1, wherein said constant identifier is a positive integer greater than zero.

4. A process executed by a computer system for generating a dispatch table for a target computer program, said target computer program having at least one method call instruction, said at least one method call instruction having a method selector, comprising the steps of:
   (a) identifying said method selector in the target computer program;
   (b) associating a unique constant value identifier with said identified method selector;
   (c) storing a pointer to said method selector and said unique constant value identifier in the dispatch table; and
   (d) storing the dispatch table.

5. The process of claim 4, wherein said dispatch table comprises a hash table.

6. The process of claim 4, wherein said dispatch table is stored in binary format.

7. The process of claim 4, wherein said unique constant value identifier is an integer greater than zero.

8. The process of claim 4, wherein said dispatch table contains a single entry for each uniquely identified method selector.

9. The process of claim 4, wherein said steps (a) through (d) are executed by a compiler process.

10. A process executed by a computer system for compiling an object-oriented computer program into a compiled program, said object-oriented computer program having a plurality of declared object classes and a plurality of method call instructions, each of said plurality of method call instructions having an object-type identifier and a method selector, said computer system having a working memory, said process comprising the steps of:
   (a) loading a dispatch table into the working memory;
   (b) identifying a method call instruction in the object-oriented computer, program, said method call instruction having a method selector and an associated index value in the dispatch table;
   (c) generating an executable computer instruction to store a pointer to the identified method call's object-type identifier in a first specified register of the computer system;
   (d) generating an executable computer instruction to store the method selector's associated index value in a second specified register of the computer system; and
   (e) generating an executable computer instruction to invoke a method dispatch function.

11. The process of claim 10, wherein said executable computer instructions are assembly language instructions.

12. The process of claim 10, wherein each said executable computer instruction is a machine-instruction equivalent to a single assembly language instruction.

13. A process executed by a computer system for compiling an object-oriented computer program into a compiled program, said object-oriented computer program having a plurality of declared object classes and a plurality of method call instructions, each of said plurality of method call instructions having an object-type identifier and a method selector, said computer system having a working memory, said process comprising the steps of:
   (a) loading a dispatch table into said working memory, said dispatch table having at least one entry, each of said at least one entry having method selector portion and an identifier value associated with said method selector portion;
   (b) identifying a method call instruction in the object-oriented computer program, said method call instruction having an identified method selector;
   (c) generating an executable computer instruction to store a pointer to the identified method call's object-type identifier in a first specified register of the computer system
   (d) if said identified method selector has an associated identifier value in the dispatch table, then generating an executable computer instruction to store the identified method selector's associated identifier value in a second specified register of the computer system, else
      (i) create a new entry in the dispatch table,
      (ii) associate a unique identifier to the identified method selector,
      (iii) store said identified method selector and said unique identifier associated with the identified method selector in the dispatch table's new entry, and
      (iv) generate an executable computer instruction to store the unique identifier value in a second specified register of the computer system; and
   (e) generating an executable computer instruction to invoke a method dispatch function.

14. The process of claim 12, wherein at least one of said executable computer instructions is an assembly language instruction.

15. The process of claim 12, wherein at least one of said executable computer instructions is a machine-instruction equivalent to a single assembly language instruction.

16. A process of compiling instructions, comprising:
generating a dispatch table that stores method names, each of which is associated with an identifier;
receiving a first instruction including a first method name that is stored in the dispatch table; and
generating at least one instruction to load the identifier associated with the first method name.

17. The process of claim 16, further comprising:
receiving a second instruction including a second method name that is not stored in the dispatch table; and
adding the second method name to the dispatch table.

18. The process of claim 16, wherein the at least one instruction loads the identifier directly.

19. The process of claim 16, wherein the identifier is an index into the dispatch table.

20. The process of claim 16, wherein the first instruction is source code that invokes a method identified by the first method name.

21. The process of claim 16, wherein the at least one instruction to load the identifier is object code.

22. A process of compiling source code instructions, comprising:
generating a dispatch table that stores method names, each of which is associated with an index into the dispatch table;
receiving a first source code instruction including a first method name that is stored in the dispatch table; and
generating at least one object code instruction to load the index associated with the first method name.

23. The process of claim 22, further comprising:
receiving a second source code instruction including a second method name that is not stored in the dispatch table; and
adding the second method name to the dispatch table.

24. A computer program product for compiling instructions, comprising:
computer code that generates a dispatch table that stores method names, each of which is associated with an identifier;
computer code that receives a first instruction including a first method name that is stored in the dispatch table;
computer code generates at least one instruction to load the identifier associated with the first method name; and
a computer readable medium that stores the computer codes.

25. The computer program product of claim 24, further comprising:
computer code that receives a second instruction including a second method name that is not stored in the dispatch table; and
computer code that adds the second method name to the dispatch table.

26. The computer program product of claim 24, wherein the at least one instruction loads the identifier directly.

27. The computer program product of claim 24, wherein the identifier is an index into the dispatch table.

28. The computer program product of claim 24, wherein the first instruction is source code that invokes a method identified by the first method name.

29. The computer program product of claim 24, wherein the at least one instruction to load the identifier is object code.

30. A computer program product for compiling source code instructions, comprising:
computer code that generates a dispatch table that stores method names, each of which is associated with an index into the dispatch table;
computer code that receives a first source code instruction including a first method name that is stored in the dispatch table;
computer code that generates at least one object code instruction to load the index associated with the first method name; and
a computer readable medium that stores the computer codes.

31. The computer program product of claim 30, further comprising:
computer code that receives a second source code instruction including a second method name that is not stored in the dispatch table; and
computer code that adds the second method name to the dispatch table.

* * * * *